United States Patent
Koizumi

(10) Patent No.: US 12,515,609 B2
(45) Date of Patent: Jan. 6, 2026

(54) VEHICULAR AIRBAG DEVICE

(71) Applicant: Autoliv Development AB, Vargarda (SE)

(72) Inventor: Akira Koizumi, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 39 days.

(21) Appl. No.: 18/684,780

(22) PCT Filed: Aug. 5, 2022

(86) PCT No.: PCT/JP2022/030117
§ 371 (c)(1),
(2) Date: Feb. 19, 2024

(87) PCT Pub. No.: WO2023/026825
PCT Pub. Date: Mar. 2, 2023

(65) Prior Publication Data
US 2024/0425011 A1     Dec. 26, 2024

(30) Foreign Application Priority Data
Aug. 24, 2021   (JP) ................................. 2021-136227

(51) Int. Cl.
*B60R 21/217*    (2011.01)
*B60R 21/203*    (2006.01)

(52) U.S. Cl.
CPC .......... *B60R 21/217* (2013.01); *B60R 21/203* (2013.01)

(58) Field of Classification Search
CPC .............. B60R 21/2103; B60R 21/217; B60R 21/2346
See application file for complete search history.

(56) References Cited

U.S. PATENT DOCUMENTS

| | | | |
|---|---|---|---|
| 11,235,731 B2 * | 2/2022 | Morita ..................... | B60R 21/26 |
| 11,760,301 B2 * | 9/2023 | Ishii ..................... | B60R 21/2346 |
| | | | 280/730.1 |
| 2001/0026065 A1 * | 10/2001 | Floersheimer ........ | B60R 21/261 |
| | | | 280/741 |

(Continued)

FOREIGN PATENT DOCUMENTS

| | | | | |
|---|---|---|---|---|
| CN | 111094078 A | * | 5/2020 | ........... B60R 21/203 |
| DE | 19858690 A1 | * | 6/2000 | ........... B60R 21/233 |
| DE | 10011066 A1 | * | 9/2001 | ........... B60R 21/233 |

(Continued)

*Primary Examiner* — Nicole T Verley
(74) *Attorney, Agent, or Firm* — Foley & Lardner LLP

(57) ABSTRACT

A vehicle airbag device includes an inflator, a bag shaped airbag cushion, and a rectifying member on the inside of the airbag cushion. The rectifying member includes a bottom surface part into which the inflator is inserted, a roof part that, when a rim of a steering wheel is likened to a dial of a clock, extends in a 12 o'clock and 6 o'clock direction on the clock when seen from a driver regularly seated in a driver seat with the steering wheel in a neutral position, and opening parts and formed in the 12 o'clock and 6 o'clock positions. The roof part includes, when seen from a 9 o'clock direction, a top part that protrudes convexly toward a driver side, and ridge line parts and that extend in both the 12 o'clock and 6 o'clock directions of the clock from the top part in an inverted arch shape.

11 Claims, 8 Drawing Sheets

(56) References Cited

U.S. PATENT DOCUMENTS

2007/0278774 A1* 12/2007 Ishiguro ................ B60R 21/233
                                                              280/739

FOREIGN PATENT DOCUMENTS

| EP | 1864871 | B1 | * | 12/2008 | ........... B60R 21/233 |
| EP | 3960550 | A1 | * | 3/2022 | ........... B60R 21/203 |
| EP | 4032756 | B1 | * | 10/2024 | ........... B60R 21/203 |
| JP | 2000-177521 | A | | 6/2000 | |
| JP | 2004-1637 | A | | 1/2004 | |
| JP | 4114303 | B2 | * | 7/2008 | ........... B60R 21/233 |
| JP | 2011-173473 | A | | 9/2011 | |
| JP | 5109601 | B2 | * | 12/2012 | |
| JP | 5206707 | B2 | * | 6/2013 | |
| JP | 2013-154830 | A | | 8/2013 | |
| JP | 5641637 | B2 | * | 12/2014 | ........... B60R 21/205 |
| JP | 2016-088173 | A | | 5/2016 | |
| WO | WO-2019069796 | A1 | * | 4/2019 | ........... B60R 21/203 |
| WO | WO-2020044793 | A1 | * | 3/2020 | |

* cited by examiner

A-A (a)

(b)

(a)

(b)

VEHICULAR AIRBAG DEVICE

TECHNICAL FIELD

The present invention relates to a vehicle airbag device installed in a vehicle steering wheel.

BACKGROUND ART

Airbag devices have generally become standard equipment in vehicles in recent years. An airbag device is a safety device which is operated in the event of an emergency such as a vehicle collision, retaining and protecting occupants utilizing an airbag cushion which expands and deploys based on gas pressure.

There are various types of airbag devices depending on the installation site and application. For example, a front airbag is provided in the center of the steering wheel in front of the driver seat primarily to protect an occupant in a front seat and a passenger airbag is provided in the instrument panel or nearby location near the passenger seat. Additionally, side airbags that expand and deploy to the side of the occupant from the side part of the seat and curtain airbags and the like that expand and deploy from above the side window inside the vehicle cabin for protecting the occupant from a side collision or a rollover crash are known.

Patent Document 1 discloses a passenger seat airbag device as an example of an airbag device for protecting the occupant of a front seat. With the technology of Patent Document 1, a rectifier cloth 69 that changes gas flow inside an airbag 40 is installed as described in FIG. 7, and the like. The rectifier cloth 69 protrudes from an installment panel 1 when an airbag 90 expands and deploys, and then receives, stops, and changes the flow of gas from an inflator 11. Patent Document 1 states that damage to the base fabric of the airbag 90 can be suppressed because the rectifier cloth 69 keeps gas from making direct contact with the inner circumferential surface of the airbag 90.

RELATED ART DOCUMENTS

Patent Documents

Patent Document 1: Japanese Unexamined Patent Application Publication 2004-1637

SUMMARY OF THE INVENTION

Problem to Be Solved By the Invention

When a vehicle is in a frontal collision, an occupant moves forward due to inertia, and, if left as-is, the occupant will make contact with a forward structure. A driver is particularly close to a steering wheel and thus the head and abdomen of the driver are prone to make contact with the steering wheel. Therefore, an airbag cushion of a front airbag must expand and deploy quickly, and must have proper deployment behavior so as to precisely fill a space between the abdomen of the occupant and the steering wheel.

Although, according to the technology of Patent Document 1, gas flow can be changed by the rectifier cloth 69, the rectifier cloth 69 is only used to protect the base fabric of the airbag 90. There is room to improve the technology of Patent Document 1 from the perspective of protecting specific regions of the body of an occupant.

In light of such problems, an object of the present invention is provide a vehicle airbag device that is able to quickly and precisely restrain a driver.

Means For Solving the Problem

In order to resolve the problem described above, a typical configuration of the vehicle airbag device according to the present invention is a vehicle airbag device installed in a vehicle steering wheel, including: a stowing part provided further to a center side than a rim of the steering wheel, that opens on a driver side; an inflator secured to a bottom of the stowing part; a bag-shaped airbag cushion that is stowed in the stowing part with a portion of the inflator stowed therein, that receives gas from the inflator, and expands and deploys toward a driver; and a rectifying member that is attached to the inside of the airbag cushion, and covers the inflator, wherein the rectifying member includes a bottom surface part installed at the bottom of the stowing part, and has an insertion hole into which the inflator is inserted; a roof part positioned on the driver side of the bottom surface part, that, if a virtual disk along the rim of the steering wheel is likened to a clock dial, extends in a direction that connects 12 o'clock and 6 o'clock on the clock, when seen from the driver regularly seated in a driver seat with the steering wheel in a neutral position; a side surface part that connects the bottom surface part and the roof part; and a plurality of opening parts formed in locations corresponding to the 12 o'clock and 6 o'clock positions, respectively, on the clock on the side surface part, and the roof part includes, when seen from a 3 o'clock or 9 o'clock direction of the clock, a top part that protrudes convexly toward the driver side, and ridge line parts that extend in both the 12 o'clock and the 6 o'clock directions of the clock from the top part in an inverted arch shape.

Because the ridge line part of the roof part forms an inverted arch shape that faces the opening parts, the above rectifying member can smoothly guide gas received by the roof part to the opening parts. At this time, the ridge line part and the opening parts, when the steering wheel is likened to a clock, are formed along the 12 o'clock and 6 o'clock directions. The 6 o'clock direction, in particular, is the direction where the abdomen of the driver is when seen from the steering wheel. Therefore, according to the above configuration, gas supplied from the inflator is guided in the direction of the abdomen of the driver by the rectifying member and the airbag cushion can be quickly expanded and deployed between the abdomen of the driver and the steering wheel, thus making is possible to protect the driver adequately.

The above rectifying member is folded and the edges thereof are stitched together with a prescribed panel in the center thereof, the bottom surface part is formed in a portion that includes the center of the panel, the side surface part is formed by a portion that excludes the bottom surface part of the panel, the roof part is formed by the stitched edges, and the opening parts are formed by not stitching parts of the edges of the panel.

According to the above configuration, the rectifying member can be realized using a simple configuration, thus making it possible to reduce material costs and workloads.

A distance between the center of the bottom surface part and the top part of the aforementioned rectifying member is greater than a distance between the center of the bottom surface part and the upper ends of the opening parts, and end parts on the 12 o'clock and 6 o'clock sides of the clock of the roof part are positioned further outside than a line section that connects the edge of an insertion hole in the bottom surface part to the edge of an opening in the stowing part.

According to the above configuration, gas received by the roof part is smoothly guided to the opening parts, and thus the gas flows efficiently into the airbag cushion from the opening parts.

A width dimension across a direction that connects 12 o'clock and 6 o'clock of the clock in the center of the above panel is larger than a width dimension of the bottom of the stowing part. According to this configuration, the end side of the panel of the rectifying member stands up along the inner wall of the stowing part when the bottom surface part formed in the center portion of the panel is positioned in the bottom of the stowing part. Therefore, when gas is supplied from the inflator, the bottom surface part can efficiently guide the gas in the direction of the roof part along the inner wall from a bottom side of the stowing part.

The above plurality of opening parts are formed to open to the same dimensions, and portions of at least half of all of the opening parts can be exposed through the opening in the stowing part.

According to the above configuration, the airbag cushion can be efficiently filled with gas from the rectifying member.

The above rectifying member may also include a plurality of small hole parts that open smaller than opening parts provided in locations that correspond to at least the 9 o'clock and 3 o'clock positions, respectively, of the clock of the side surface part.

The above plurality of small hole parts, together with the opening parts, make it possible to efficiently distribute gas to every corner of, and thus fill, the airbag cushion.

The above plurality of small hole parts are provided in locations that are further inside than a line section that connects the center of the bottom surface part to the upper ends of the opening parts, and that are exposed through the opening in the stowing part.

Because gas can be discharged through the small hole parts configured as described above in a direction orthogonal to the direction the opening parts discharge gas, gas can be efficiently distributed to every corner of, and thus fill, the airbag cushion.

The dimensions of the roof part described above may be two or more times the inner diameter of the stowing part in the direction that connects 12 o'clock and 6 o'clock of the clock.

Using a rectifying member that includes the above roof part makes it possible for gas to flow efficiently in the 12 o'clock and 6 o'clock directions in the airbag cushion.

The aforementioned distance between the center of the bottom surface part and the top part described above may be 65 mm or less when the airbag cushion expands and deploys.

The above configuration makes it possible to realize a rectifying member where gas flows efficiently in the airbag cushion.

Effect of the Invention

The present invention makes it possible to provide a vehicle airbag device that is able to quickly and precisely restrain a driver.

DESCRIPTION OF THE PREFERRED EMBODIMENTS

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Figure 1:
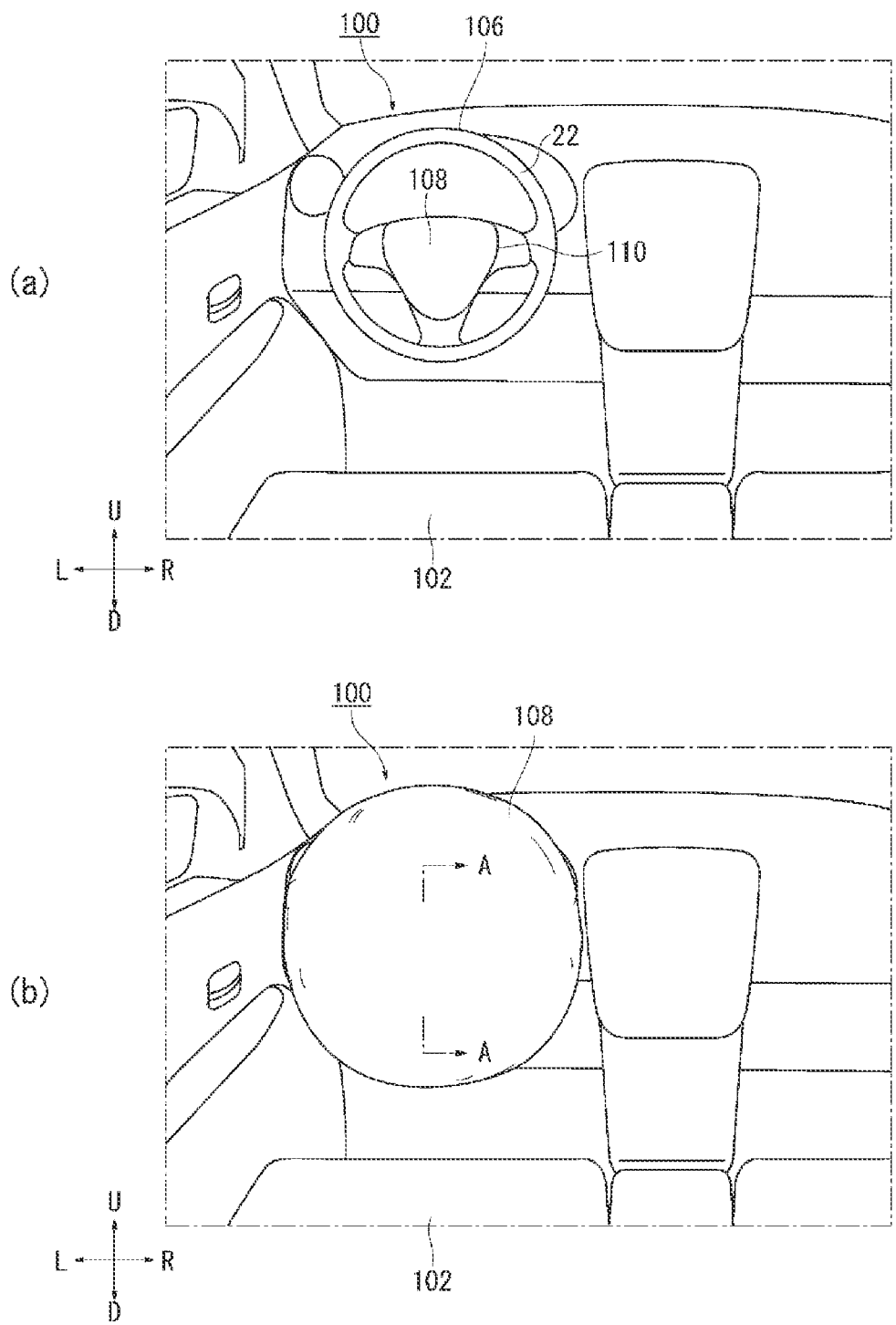
FIG. 1 is a diagram depicting the outline of a vehicle airbag device in an embodiment of the present invention.

FIG. 1 is a diagram depicting the outline of a vehicle airbag device 100 in an embodiment of the present invention. FIG. 1(a) is a diagram depicting a state of the vehicle airbag device 100 before activation. As depicted in FIG. 1(a), the vehicle airbag device 100 is implemented as a frontal airbag of a driver seat 102 on a front row left side in a left hand drive vehicle.

In the present embodiment, when a driver 104 (see FIG. 2) is seated in a regular posture in the driver seat 102, the direction facing the driver 104 is referred to as forward, the opposite direction is referred to as reward, and the directions are referred to as the front-to-back direction when axes on coordinates are depicted. Furthermore, when the driver 104 is seated in the driver seat 102 in a regular posture, the right side of the driver 104 is referred to as the right direction, the left side of the driver 104 is referred to as the left direction, and the directions are referred to as the left-right direction when axes on coordinates are depicted. Additionally, when the driver 104 is seated in a regular posture, the head direction of the driver 104 is referred to as up, the waist direction of the driver 104 is referred to as down, and the directions are referred to the up-down direction when axes on coordinates are depicted. Also, in the drawings used in the description below, as necessary, the front, back, left, right, up, and down directions with reference to the driver 104 described above are depicted by arrows F (Forward), B (Back), L (Left), R (Right), U (up), and D (down).

The vehicle airbag device 100 is installed in a steering wheel 106, and the driver 104 (see FIG. 2, and the like) seated in the driver seat 102 is restrained by an airbag cushion 108 (see FIG. 1(b)) during emergencies, such as when a vehicle is hit by an impact, or the like. The airbag cushion 108 is a bag shaped member that can be expanded using gas, that is made compact for stowing by being rolled or folded, and is then stowed in a stowing part 110 in the center of the steering wheel 106.

FIG. 1(b) is a diagram depicting a state of the vehicle airbag device 100 after activation. The airbag cushion 108 expands and deploys in a round bag shape when seen from a driver seat side. The airbag cushion 108 is formed by overlapping and stitching or adhering a plurality of base fabrics configuring a front surface thereof, or by spinning and weaving, or the like, using One-Piece Woven (OPW).

Figure 2:
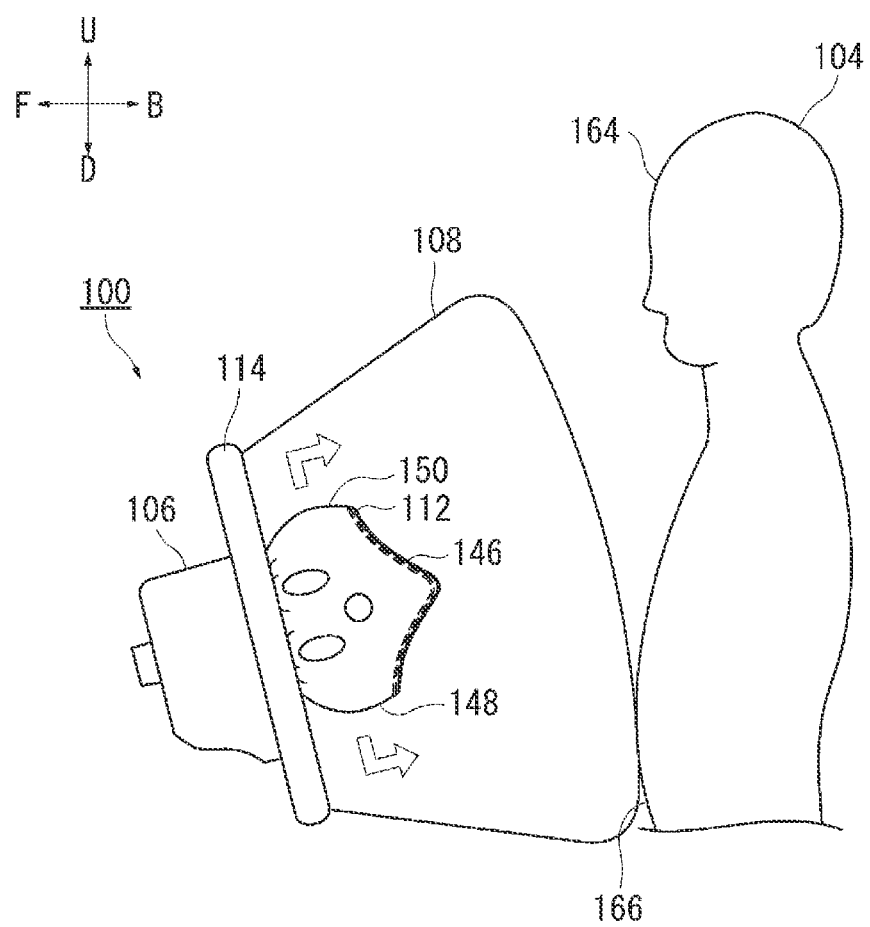
FIG. 2 is a diagram depicting an internal configuration of the airbag cushion of FIG. 1(b).

FIG. 2 is a diagram depicting an internal configuration of the airbag cushion 108 of FIG. 1(b). FIG. 2 depicts the airbag cushion 108 and the driver 104 of FIG. 1(b) when seen from a side direction. A rectifying member 112 is provided inside the airbag cushion 108 of the vehicle airbag device 100. The rectifying member 112 regulates a flow of gas from an inflator 126 (FIG. 3) described later, and then distributes the gas into the airbag cushion 108. The vehicle airbag device 100 is able to use the rectifying member 112 to quickly and precisely restrain the driver with the airbag cushion.

Figure 3:
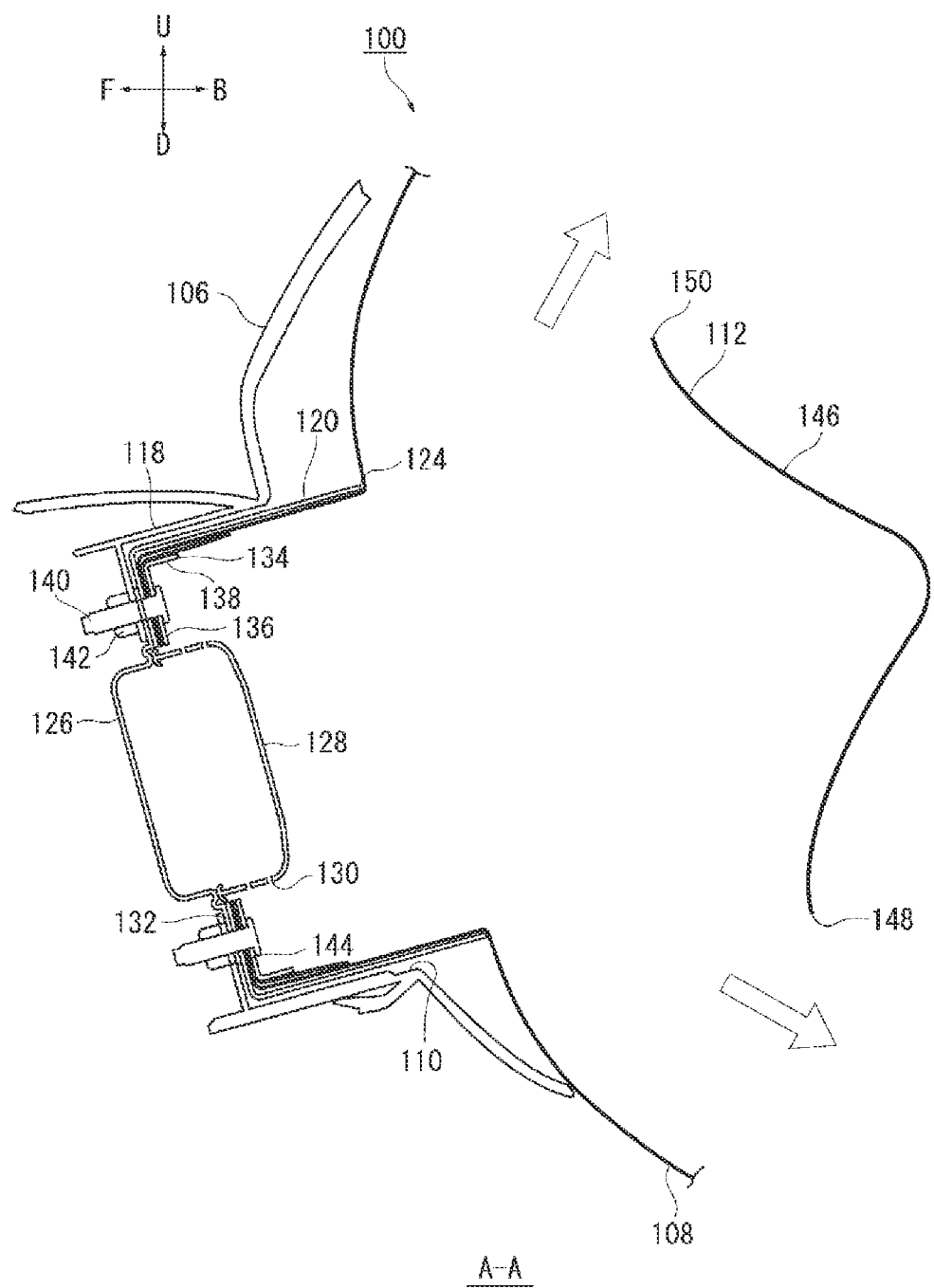
FIG. 3 is a cross-sectional view along A-A of the vehicle airbag device in FIG. 1(b).

FIG. 3 is a cross-sectional view along A-A of the vehicle airbag device 100 of FIG. 1(b). Cross section A-A is a longitudinal cross section along vehicle front-to-back and up-down directions in the position where the rectifying member 112 is provided inside the airbag cushion 108. An overview of the configuration of the vehicle airbag device 100 is described below beginning with a description of the rectifying member 112.

The stowing part 110 is provided in a location that is closer to the center than a rim 114 (see FIG. 1(a)) of the steering wheel 106. The stowing part 110 is configured to include a recessed part 118 formed in the steering wheel 106, a case 120 installed in the recessed part 118, and a cover 122 (see FIG. 1(a)) that covers the case 120. The case 120 has a cylindrical structure (see FIG. 6(a), and the like), and an opening 124 is formed on the driver side. A prescribed tear line with a thinned cross section is provided on the cover 122, which line is designed to split when the airbag cushion 108 expands and deploys.

The inflator 126 is a gas generating device secured to a bottom of the stowing part 110. The inflator 126 is a gas generating device that operates based on an impact detection signal sent from a sensor not depicted in the drawings, and that supplies gas to the airbag cushion 108. The inflator 126 is disc shaped and includes a main body part 128 and a gas emitting hole 130 provided on the side surface of the main body part 128. A flange 132 that overlaps a bottom surface of the case 120 is also provided on the outer circumference of the main body part 128.

A retainer 134 is provided around the inflator 126. The retainer 134 is a member made of sheet metal that holds the inflator 126, and that is provided inside the airbag cushion 108 and rectifying member 112. The retainer 134 includes a flat base part 136 and a vertical wall 138. A hole that passes through the main body part 128 of the inflator 126 is formed in the center of the base part 136. The vertical wall 138 rises from around the base part 136 and a height position thereof is lower than the gas emitting hole 130 of the inflator 126 so as not to block gas.

A bolt 140 is attached to the base part 136 of the retainer 134. The retainer 134 is secured to the airbag cushion 108, the rectifying member 112, and the inflator 126 using the bolt 140 and a nut 142. In this way, the airbag cushion 108 and the rectifying member 112, with part of the main body part 128 of the inflator 126 inserted therein, are attached to a bottom of the case 120 using the retainer 134.

The rectifying member 112 is attached to the inside of the airbag cushion 108 so as to cover the inflator 126. The rectifying member 112 includes a bottom surface part 144 that is installed on the bottom of the case 120 by the aforementioned retainer 134, and a roof part 146 that deploys in a position on the driver side when seen from the bottom surface part 144. After gas emitted from the inflator 126 is received on the inside of the roof part 146, the rectifying member 112 uses two opening parts 148 and 150 to distribute the gas in the airbag cushion 108.

Figure 4:
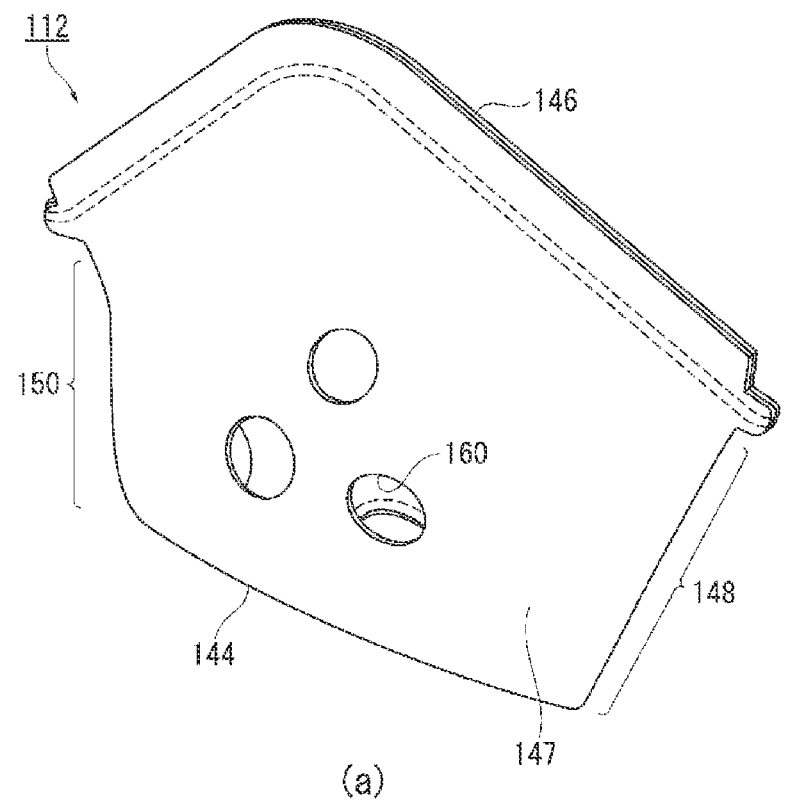
FIG. 4 is a diagram depicting the rectifying member of FIG. 2 by itself.
Figure 4:
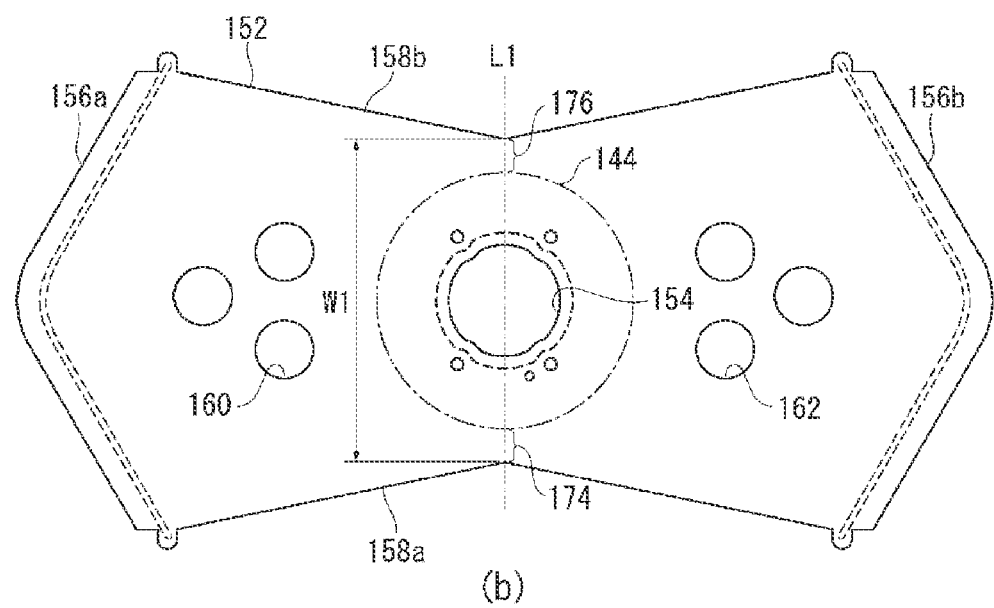

FIG. 4 is a diagram depicting the rectifying member 112 of FIG. 2 by itself. FIG. 4(a) is a perspective view depicting the rectifying member 112. The rectifying member 112 has a three-dimensional shape formed by folding a one-sheet panel 152 (see FIG. 4(b)) made using the same base fabric, or the like, as the airbag cushion 108 (see FIG. 2, and the like) for material in the center along a center line L1 and then stitching the edges of the panel together. A side surface part 147 of the rectifying member 112 is a portion that connects the bottom surface part 144 and the roof part 146, and the opening parts 148 and 150 and small hole parts 160 and 162 (see FIG. 4(b)) that discharge gas are provided therein.

FIG. 4(b) is a drawing of a state where the panel 152 that forms the rectifying member 112 of FIG. 4(a) is spread out on a flat surface. The panel 152 has a left-to-right symmetrical shape with the center line L1 as a boundary. An insertion hole 154 into which the main body part 128 of the inflator 126 (see FIG. 3) is inserted is provided in the center of the panel 152.

The bottom surface part 144 is a portion that is, together with the airbag cushion 108, installed on the bottom of the case 120 using the aforementioned retainer 134 (see FIG. 3). The bottom surface part 144 is formed in a range in the center of the panel 152 that includes the insertion hole 154. The side surface part 147 of FIG. 4(a) is formed by a portion of the panel 152 of FIG. 4(b) that excludes the bottom surface part 144.

The roof part 146 of FIG. 4(a) is formed by overlapping and stitching left and right triangular edges 156a and 156b of the panel 152 (see FIG. 4(b)) together. The opening parts 148 and 150 in the rectifying member 112 are formed by not stitching edges 158a and 158b, which edges stretch left and right from the center of the figure on a top and bottom of the panel 152 of FIG. 4(b).

The small hole parts 160 and 162 are also provided between the bottom surface part 144 and the roof part 146. The small hole parts 160 and 162 are, together with the opening parts 148 and 150, holes that discharge gas. In the present embodiment, three each of the small hole parts 160 and 162 are provided on both left and right sides when seen from the central insertion hole 154, however, the number thereof to be provided is not limited to this.

Realizing the rectifying member 112 with a simple configuration using the single-sheet panel 152 in this way makes it possible to reduce material costs and workload.

Figure 5:
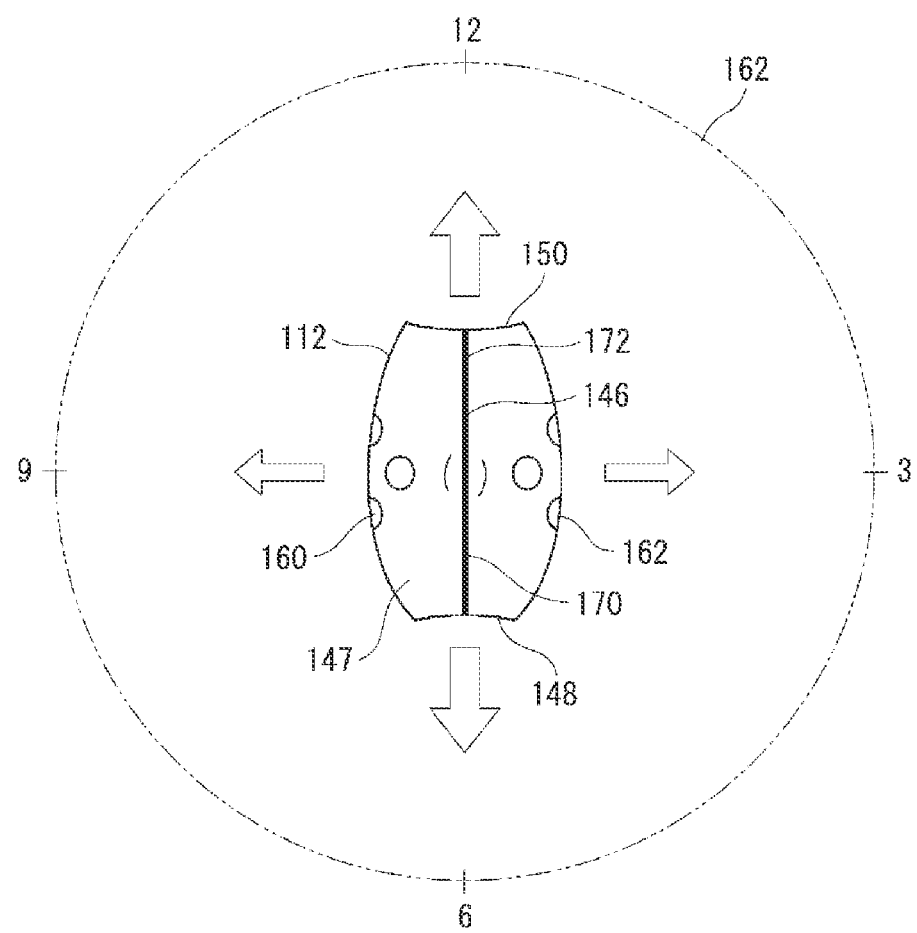
FIG. 5 is a diagram depicting the rectifying member of FIG. 2 from a driver side.

FIG. 5 is a diagram depicting the rectifying member 112 of FIG. 2 from the driver side. In the present embodiment, the opening parts 148 and 150 in the rectifying member 112 are designed so that gas can flow in a specific direction. The configuration of the rectifying member is described below by likening the steering wheel 106 to a clock and using time positions on a dial 162 of the clock as examples.

The dial 162 of the clock depicted in FIG. 5 is depicted virtually as a disc along an end part on the driver 104 side of the rim 114 of the steering wheel 106 of FIG. 2. The roof part 146, when seen from the driver 104 (see FIG. 2) seated in a regular posture in the driver seat 102 (see FIG. 1(b)) while the steering wheel 106 is in a neutral position, extends across the direction that connects 12 o'clock and 6 o'clock on the clock. Additionally, the opening parts 148 and 150 are formed in locations on the side surface part 147 that correspond to positions at 12 o'clock and 6 o'clock on the clock. As depicted in FIG. 2, the 12 o'clock direction corresponds to forward and up and the 6 o'clock direction corresponds to rearward and down. Because the opening parts 148 and 150 are provided in these positions, the portions of the airbag cushion 108 that restrain a head 164 and an abdomen 166 of the driver 104 expand and deploy quickly.

Figure 6:
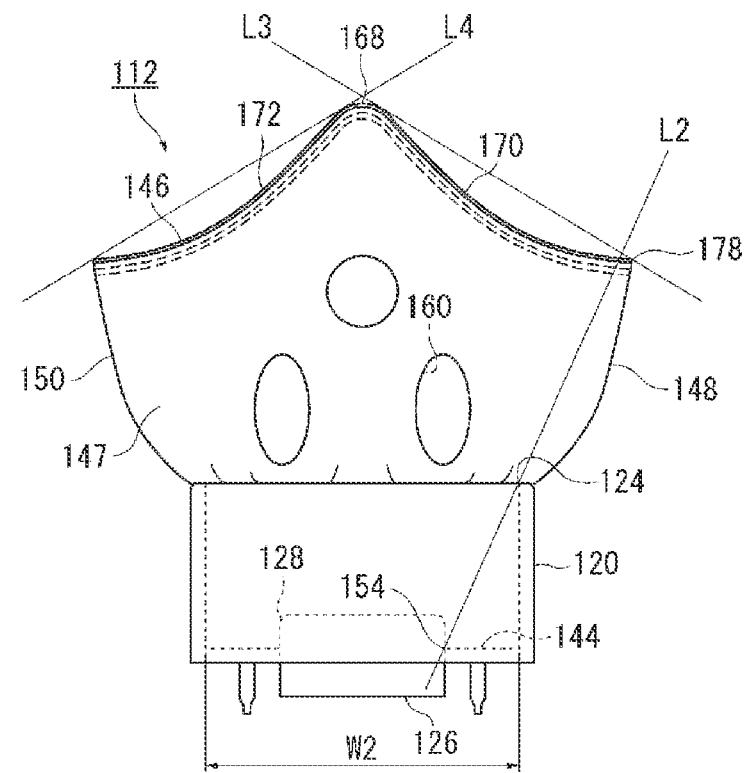
FIG. 6 is a diagram depicting the rectifying member of FIG. 4 from each direction.
Figure 6:
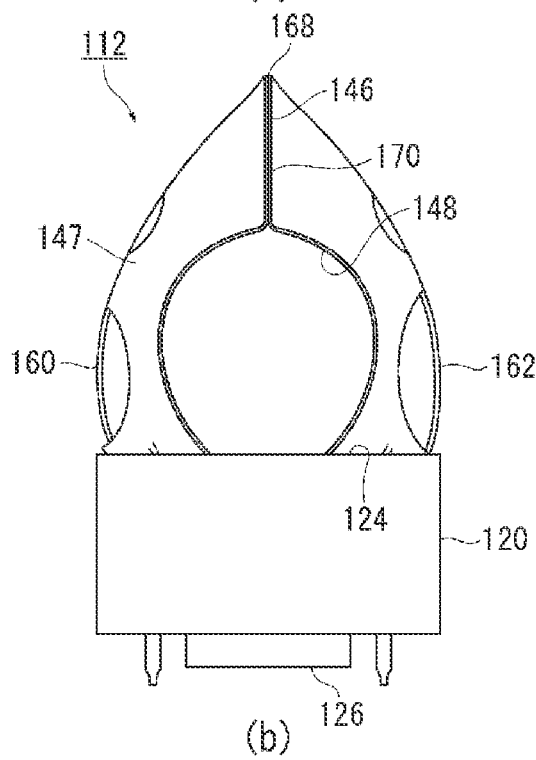

FIG. 6 is a diagram depicting the rectifying member 112 of FIG. 4 from each direction. FIG. 6(a) is a diagram depicting the rectifying member 112 from the 9 o'clock direction of FIG. 5. FIG. 6 also depicts the case 120 (see FIG. 3) together with the rectifying member 112.

The roof part 146 includes a top part 168 that protrudes convexly on the driver 104 side and ridge line parts 170 and 172 that extend from the top part 168 in inverted arch shapes in the 12 o'clock and 6 o'clock directions, respectively, when seen from the 9 o'clock direction or the 3 o'clock direction of FIG. 4. The inverted arch shapes referred to here are concave shapes forming gently curved arches in the direction where the inflator 126 is provided with respect to virtual ridge lines L3 and L4 that extend in straight lines from the top part 168 toward an end part of the opening part 148 in the 6 o'clock position and the opening part 150 in the 12 o'clock position on the top part 168 side, respectively.

FIG. 6(b) is a diagram depicting the rectifying member 112 from the 6 o'clock direction of FIG. 5. As was described above, the opening parts 148 and 150 are formed in the rectifying member 112 by not stitching the edges 158a and 158b (see FIG. 4(b)) in the 6 o'clock and 12 o'clock directions. The aforementioned roof part 146 is able to smoothly guide gas received on the inside thereof to the opening parts 148 and 150 formed in the 6 o'clock and 12 o'clock directions using the inverted arch shaped ridge line parts 170 and 172.

Because the ridge line parts 170 and 172 (see FIG. 6(a)) of the roof part 146 form inverted arch shapes facing the opening parts 148 and 150, the rectifying member 112 is able to smoothly guide gas received by the roof part 146 to the opening parts 148 and 150 without any gas remaining inside. Additionally, the ridge line parts 170 and 172 and the opening parts 148 and 150 are formed in the 6 o'clock and 12 o'clock directions (see FIG. 5) when the steering wheel 106 is likened to a clock. The 6 o'clock direction, in particular, is the direction where the abdomen 166 of the driver 104 is when seen from the steering wheel 106 (see FIG. 2). Therefore, according to the embodiment, gas supplied from the inflator 126 (see FIG. 3) is guided in the direction of the abdomen 166 of the driver 104 by the rectifying member 112 and the airbag cushion 108 can be quickly expanded and deployed between the abdomen 166 of the driver 104 and the steering wheel 106, thus making is possible to protect the driver 104 adequately.

As depicted in FIG. 5, the small hole parts 160 and 162 are provided in the rectifying member 112. The small hole parts 160 and 162 are formed in locations that correspond to positions at 9 o'clock and 3 o'clock on the clock. Because each of the plurality of small hole parts 160 and 162 is open to a diameter smaller than the opening parts 148 and 150, the opening parts 148 and 150 discharge more gas. Thus, the airbag cushion 108 is able to expand preferentially in the 6 o'clock and 12 o'clock directions using the opening parts 148 and 150 while also expanding in the 9 o'clock and 3 o'clock directions using the small hole parts 160 and 162.

Thus, the opening parts 148 and 150 and the small hole parts 160 and 162 of the rectifying member 112 make it possible to distribute gas to every corner in, and thus fill, the airbag cushion 108. In cases where the driver 104 (see FIG. 2) is female, or the like, and thus small in stature, in particular, the driver may drive with the driver seat 102 (see FIG. 1(a)) close to the steering wheel 106, which thus reduces a distance between the driver 104 and the steering wheel 106. Even in such cases, the airbag cushion 108 according to the present embodiment can, by being expanded quickly in the 6 o'clock direction (see FIG. 5), fill the space between the steering wheel 106 and the abdomen 166 of the driver 104, and thus keep the driver 104 from making contact with the steering wheel 106.

Furthermore, in cases where the driver 104 (FIG. 2) is positioned irregularly in the driver seat 102 (see FIG. 1(b)) (commonly referred to a being out of position), the driver 104 may make contact with the airbag cushion 108 to the left or right thereof, which can lead to unexpected injury values for the driver 104. Even in such cases, because the airbag cushion 108 according to the present embodiment expands non-preferentially in the 3 o'clock and 9 o'clock directions (see FIG. 5) using the small diameter small hole parts 160 and 162, a load on and injury value for the driver 104 are reduced when the driver makes contact to the left or right.

Figure 7:
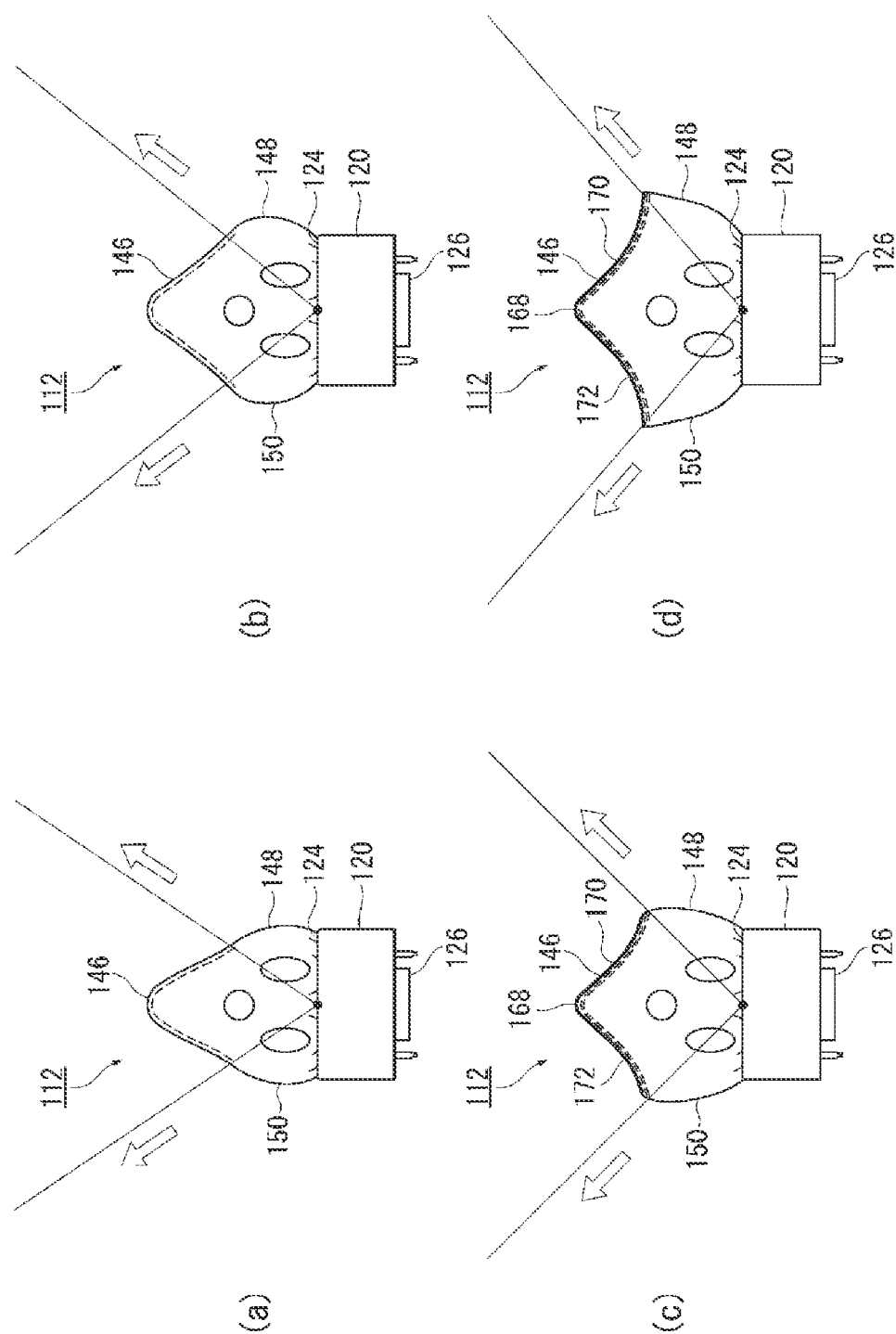
FIG. 7 is a diagram depicting a process whereby the rectifying member of FIG. 6(a) activates.

FIG. 7 is a diagram depicting a process whereby the rectifying member 112 of FIG. 6(a) activates. FIG. 7(a) is a diagram depicting the rectifying member 112 in an initial deployed state. When gas is supplied from the inflator 126, the gas is received by the roof part 146, and the rectifying member 112 deploys by flying out from the opening 124 in the case 120. Because the opening 124 in the case 120 is covered by the cover 122 (see FIG. 1(a)) at this time, the tear line in the cover 122 is split by the expansion pressure of the rectifying member 112 and the airbag cushion 108.

FIG. 7(b) is a diagram depicting the rectifying member 112 in a deployed state following the state depicted in FIG. 7(a). Gas, after hitting the inside of the roof part 146, exits to the outside through the opening parts 148 and 150. The rectifying member 112 thus deploys in the 12 o'clock and 6 o'clock directions (see FIG. 5).

FIG. 7(c) is a diagram depicting the rectifying member 112 in a deployed state following the state depicted in FIG. 7(b). The inverted arch shaped ridge line parts 170 and 172 depicted in FIG. 6(a) make it possible for gas to flow smoothly in the rectifying member 112 toward the opening parts 148 and 150.

FIG. 7(d) is a diagram depicting the rectifying member 112 in a deployed state following the state depicted in FIG. 7(c). The roof part 146 is able to spread out beyond the opening 124 in the case 120 in the 12 o'clock and 6 o'clock directions (see FIG. 5). Thus, gas is supplied in the rectifying member 112 in the 12 o'clock and 6 o'clock directions, and the portions of the airbag cushion 108 that restrain the head 164 and abdomen 166 of the driver 104 (see FIG. 2) expand and deploy quickly.

Figure 8:
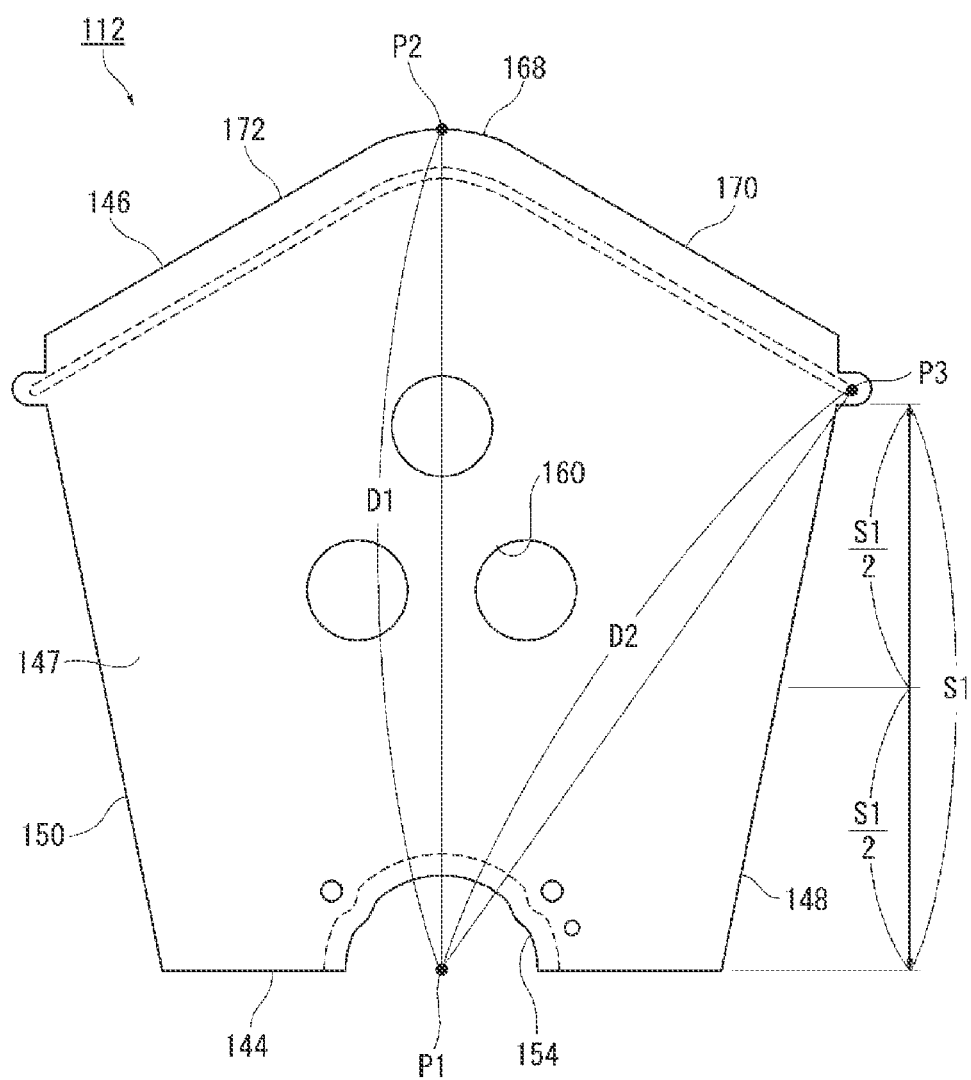
FIG. 8 is a diagram depicting a state where the rectifying member of FIG. 3(a) is placed on a flat surface.

FIG. 8 is a diagram depicting a state where the rectifying member 112 of FIG. 3(a) is placed on a flat surface. The opening parts 148 and 150 are formed to open to the same dimensions. Additionally, portions of the opening parts 148 and 150 that are at least ½ of a total dimension S1 can be exposed through the opening 124 in the case 120 (see FIG. 6(a)), which is the stowing part 110. This configuration makes it possible to efficiently fill the airbag cushion 108 from the rectifying member 112.

A width dimension W1 of a portion in the center of the panel 152 of FIG. 4(b) is larger than a width dimension W2 (W1>W2) of the bottom of the case 120 (see FIG. 6(a)), which is the stowing part 110. According to this configuration, end side portions 174 and 176 of the panel 152 of the rectifying member 112 stand up along the inner wall of the stowing part 110 when the bottom surface part 144 formed in the center portion of the panel 152 is positioned in the bottom of the stowing part 110. Therefore, when gas is supplied from the inflator 126, the bottom surface part 144 can efficiently guide the gas in the direction of the roof part 146 along the inner wall from the bottom side of the stowing part 110.

As depicted in FIG. 8, a distance D1 in the rectifying member 112 from a center P1 of the bottom surface part 144 to an apex P2 of the top part 168 is set to be greater than a distance D2 (D1>D2) from the center P1 of the bottom surface part 144 to an upper end P3 of the opening part 148. As one example for the rectifying member 112, the distance D1 from the center P1 of the bottom surface part 144 to the apex P2 of the top part 168 is set to be 65 mm or less when the airbag cushion 108 is expanded and deployed.

As depicted in FIG. 6(a), an end part 178 (roughly equivalent to the upper end P3 of FIG. 8) on the 12 o'clock and 6 o'clock side of the clock of the roof part 146 is positioned further outside than a line section L2 that connects the edge of the insertion hole 154 into which the inflator 126 provided on the bottom surface part 144 is inserted to the edge of the opening 124 in the case 120, which is the stowing part 110. Gas received in the rectifying member 112 by the roof part 146 can be smoothly guided by this configuration to the opening parts 148 and 150, and thus the gas flows efficiently into the airbag cushion 108 from the opening parts 148 and 150.

As depicted in FIG. 8, the plurality of small hole parts 160 are provided in locations that are further inside than a line section of the distance D2 that connects the center P1 of the bottom surface part 144 to the upper end P3 of the opening part 148, and that are exposed through the opening 124 in the case 124 (FIG. 6(a)). Because gas can be discharged through the small hole parts 160 and 162 having this configuration in a direction orthogonal to the direction the opening parts 148 and 150 discharge gas, gas can be efficiently distributed to every corner of, and thus fill, the airbag cushion 108.

As another example of the rectifying member, it is also possible, for example, to set the width dimension across the direction that connects 12 o'clock and 6 o'clock on the roof part 146 of FIG. 5 to be two or more times the inner diameter (equivalent to W2) of the case 120 (see FIG. 6(a)), which is the stowing part 110. According to this configuration, the rectifying member makes it possible for gas to flow efficiently in the 12 o'clock and 6 o'clock directions in the airbag cushion 108.

Preferred Embodiments of the present invention were described with reference to the appended drawings, but it goes without saying that the present invention is not limited to such examples. It is clear that a person skilled in the art could conceive of various modifications or revisions within the scope set forth by the claims, and it would be understood that these modifications or revisions would belong to the technical scope of the invention.

Moreover, examples in which the airbag device according to the present invention was applied in a vehicle were described in the embodiments above, however, the present invention can also be applied to airplanes, ships, and other applications in addition to vehicles, and the same operations and effects can be obtained.

INDUSTRIAL APPLICABILITY

The present invention can be used in a vehicle airbag device installed in a vehicle steering wheel.

EXPLANATION OF CODES

100 . . . Vehicle airbag device, 102 . . . Driver seat, 104 . . . Driver, 106 . . . Steering wheel, 108 . . . Airbag cushion, 110 . . . Stowing part, 112 . . . Rectifying member, 114 . . . Rim, 118 . . . Recessed part, 120 . . . Case, 122 . . . Cover, 124 . . . Opening, 126 . . . Inflator, 128 . . . Main body part, 130 . . . Gas emitting hole, 132 . . . Flange, 134 . . . Retainer, 136 . . . Base part, 138 . . . Vehicle wall, 140 . . . Bolt, 142 . . . Nut, 144 . . . Bottom surface part, 146 . . . Roof part, 147 . . . Side surface part, 148 and 150 . . . Opening parts, 152 . . . Panel, 154 . . . Insertion hole, 156a and 156b . . . Edges, 158a and 158b . . . Edges, 160 . . . Small hole part, 162 . . . Dial, 164 . . . Head, 166 . . . Abdomen, 168 . . . Top part, 170 and 172 . . . Ridge line parts, 174 and 176 . . . Portions, 178 . . . End part, D1 . . . Distance, D2 . . . Distance, L1 . . . Center line, L2 . . . Line section, L3 and L4 . . . Ridge lines, P1 . . . Center, P2 . . . Apex, P3 . . . Upper end, S1 . . . Dimension, W1 . . . width dimension, W2 . . . width dimension

The invention claimed is:

1. A vehicle airbag device installed in a vehicle steering wheel, comprising:
   a stowing part provided further to a center side than a rim of the steering wheel, that opens on a driver side;
   an inflator secured to a bottom of the stowing part;
   a bag-shaped airbag cushion that is stowed in the stowing part with a portion of the inflator stowed therein, that receives gas from the inflator, and expands and deploys toward a driver; and
   a rectifying member that is attached to the inside of the airbag cushion, and that covers the inflator, wherein
   the rectifying member includes a bottom surface part installed at the bottom of the stowing part, and has an insertion hole into which the inflator is inserted;
   a roof part positioned on the driver side of the bottom surface part, that, if a virtual disk along the rim of the steering wheel is likened to a clock dial, extends in a direction that connects 12 o'clock and 6 o'clock on the clock, when seen from the driver regularly seated in a driver seat with the steering wheel in a neutral position;
   a side surface part that connects the bottom surface part and the roof part; and
   a plurality of opening parts formed in locations corresponding to the 12 o'clock and 6 o'clock positions, respectively, on the clock on the side surface part, and the roof part includes, when seen from a 3 o'clock or 9 o'clock direction of the clock, a top part and ridge line parts formed by stitching triangular edges of the roof part together such that, when the vehicle airbag device is deployed, the top part protrudes convexly toward the driver side, and the ridge line parts extend in both the 12 o'clock and the 6 o'clock directions of the clock from the top part in concave curves toward the inflator to form inverted arch shapes.

2. The vehicle airbag device according to claim 1, wherein the rectifying member is folded with a prescribed panel in a center and edges thereof are stitched together,
   the bottom surface part is formed in a portion that includes the center of the panel,
   the side surface part is formed by a portion that excludes the bottom surface part of the panel,
   the roof part is formed by the stitched edges, and
   the opening part is formed by not stitching a portion of the edges of the panel.

3. The vehicle airbag device according to claim 2, wherein, in the rectifying member,
   a distance between the center of the bottom surface part and the top part of the rectifying member is greater than a distance between the center of the bottom surface part and the upper ends of the opening parts, and end parts on the 12 o'clock and 6 o'clock sides of the clock of the roof part are positioned further outside than a line section that connects the edge of an insertion hole in the bottom surface part to the edge of an opening in the stowing part.

4. The vehicle airbag device according to claim 3, wherein a width dimension across a direction that connects 12 o'clock and 6 o'clock of the clock in the center of the panel is larger than a width dimension of the bottom of the stowing part.

5. The vehicle airbag device according to claim 2, wherein a width dimension across a direction that connects 12 o'clock and 6 o'clock of the clock in the center of the panel is larger than a width dimension of the bottom of the stowing part.

6. The vehicle airbag device according to claim 1, wherein
the plurality of opening parts are formed to open to the same dimensions, and portions of at least half of all of the opening parts can be exposed through the opening in the stowing part.

7. The vehicle airbag device according to claim 1, wherein the rectifying member also includes a plurality of small hole parts that open smaller than opening parts provided in locations that correspond to at least the 9 o'clock and 3 o'clock positions, respectively, of the clock of the side surface part.

8. The vehicle airbag device according to claim 7, wherein
the plurality of small hole parts are provided in locations that are further inside than a line section that connects the center of the bottom surface part to the upper ends of the opening parts, and that are exposed through the opening in the stowing part.

9. The vehicle airbag device according to claim 1, wherein the dimensions of the roof part are two or more times the inner diameter of the stowing part in the direction that connects 12 o'clock and 6 o'clock of the clock.

10. The vehicle airbag device according to claim 1, wherein the distance between the center of the bottom surface part and the top part may be 65 mm or less when the airbag cushion expands and deploys.

11. The vehicle airbag device according to claim 1, wherein the rectifying member is formed from a single fabric panel.

* * * * *